United States Patent
Quach et al.

(10) Patent No.: US 10,437,966 B1
(45) Date of Patent: *Oct. 8, 2019

(54) IN-CONTEXT CONTROL OF FEED PRIVACY SETTINGS

(71) Applicant: Google LLC, Mountain View, CA (US)

(72) Inventors: Daniel Quach, Los Angeles, CA (US); Justin Lewis, Marina del Rey, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/870,345

(22) Filed: Jan. 12, 2018

Related U.S. Application Data

(63) Continuation of application No. 13/920,972, filed on Jun. 18, 2013, now Pat. No. 9,886,562.

(51) Int. Cl.
*G06F 21/10* (2013.01)
(52) U.S. Cl.
CPC .................... *G06F 21/10* (2013.01)
(58) Field of Classification Search
CPC ........................................................ G06F 21/10
USPC ............................................................. 726/26
See application file for complete search history.

(56) References Cited

U.S. PATENT DOCUMENTS

| | | | |
|---|---|---|---|
| 7,590,691 B2 * | 9/2009 | Gonsalves | G06F 17/3089 709/204 |
| 8,583,683 B2 | 11/2013 | Rathod | |
| 9,043,329 B1 | 5/2015 | Patton | |
| 9,413,794 B1 * | 8/2016 | Saylor | H04L 65/4076 |
| 9,652,525 B2 | 5/2017 | Patton | |
| 2007/0083536 A1 * | 4/2007 | Darnell | G06F 17/30867 |
| 2007/0083894 A1 | 4/2007 | Gonsalves | |
| 2008/0040673 A1 * | 2/2008 | Zuckerberg | G06F 17/30867 715/745 |
| 2009/0049525 A1 | 2/2009 | D'Angelo et al. | |
| 2010/0318571 A1 | 12/2010 | Pearlman | |
| 2011/0153669 A1 | 6/2011 | Villa | |
| 2011/0270968 A1 | 11/2011 | Salsburg | |
| 2011/0276396 A1 * | 11/2011 | Rathod | G06Q 10/00 705/14.49 |
| 2012/0079004 A1 | 3/2012 | Herman | |
| 2012/0143948 A1 | 6/2012 | Archambault | |
| 2012/0150598 A1 | 6/2012 | Griggs | |
| 2012/0150972 A1 | 6/2012 | Morris | |
| 2012/0158917 A1 | 6/2012 | Julia | |
| 2012/0204272 A1 | 8/2012 | Svensson et al. | |

(Continued)

*Primary Examiner* — Abu S Sholeman
(74) *Attorney, Agent, or Firm* — Lowenstein Sandler LLP

(57) ABSTRACT

Systems and methods for providing feed privacy settings in-context with an activity that will be affected by the feed privacy setting. An example method comprising: receiving an indication of an occurrence of an activity in a content sharing platform, the occurrence of the activity corresponding to a feed item of a first feed item type; requesting user input via a user interface that simultaneously presents the feed item of the first feed item type and a privacy setting selection for the first feed item type, wherein the user input pertains to the privacy setting selection; receiving the privacy setting selection for the first feed item type while the user interface presents the feed item; and in response to receiving the privacy setting selection, updating a privacy setting for multiple feed items comprising the feed item and a subsequent feed item of the first feed item type.

16 Claims, 6 Drawing Sheets

(56) References Cited

U.S. PATENT DOCUMENTS

| | | |
|---|---|---|
| 2012/0256917 A1 | 10/2012 | Lieberman |
| 2013/0007148 A1 | 1/2013 | Olsen |
| 2013/0024788 A1* | 1/2013 | Olsen .................... G06Q 10/10 715/753 |
| 2013/0091004 A1 | 4/2013 | Gottlieb |
| 2013/0097253 A1 | 4/2013 | Mencke |
| 2013/0097718 A1* | 4/2013 | Mills .................. A01K 67/0275 800/18 |
| 2013/0304817 A1 | 11/2013 | Hu et al. |
| 2014/0013437 A1 | 1/2014 | Anderson |
| 2014/0053228 A1 | 2/2014 | Mahadevan |
| 2014/0089100 A1 | 3/2014 | Sihvola |
| 2014/0123247 A1 | 5/2014 | Abhyanker |
| 2014/0129460 A1 | 5/2014 | Budzienski |
| 2014/0129942 A1* | 5/2014 | Rathod ............ H04N 21/44222 715/720 |
| 2014/0130140 A1 | 5/2014 | Abhyanker |
| 2014/0278896 A1 | 9/2014 | Anand |
| 2014/0281559 A1 | 9/2014 | Trachtenberg |
| 2014/0281890 A1 | 9/2014 | D'Angelo |
| 2014/0282071 A1 | 9/2014 | Trachtenberg |
| 2014/0313659 A1 | 10/2014 | Trachtenberg |
| 2015/0186497 A1 | 7/2015 | Patton |
| 2015/0213275 A1 | 7/2015 | Reese |
| 2015/0326522 A1 | 11/2015 | Pu |
| 2016/0255139 A1 | 9/2016 | Rathod |
| 2016/0380978 A1 | 12/2016 | Brunn |
| 2017/0080346 A1 | 3/2017 | Abbas |
| 2017/0220668 A1 | 8/2017 | Patton |

\* cited by examiner

IN-CONTEXT CONTROL OF FEED PRIVACY SETTINGS

RELATED APPLICATIONS

This application is a continuation of application Ser. No. 13/920,972, filed Jun. 18, 2013, entitled "In-Context Control of Feed Privacy Settings," which is incorporated by reference herein.

TECHNICAL FIELD

This disclosure relates to the field of media viewing services and, in particular, to using in-context control of feed privacy settings.

BACKGROUND

On the Internet, content sharing platforms or other applications allow users to upload, view, and share digital content such as media items. Such media items may include audio clips, movie clips, TV clips, and music videos, as well as amateur content such as video blogging, short original videos, pictures, photos, other multimedia content, etc. Users may use computing devices (such as smart phones, cellular phones, laptop computers, desktop computers, netbooks, tablet computers) to use, play, and/or consume the media items (e.g., watch digital videos, listen to digital music).

The content sharing platforms can include one or more channels and the one or more channels can be viewable over the Internet. A channel is a mechanism for providing certain media items and/or for providing access to media items to subscribers. Media items for the channel can be selected by a user, uploaded by a user, selected by a content provider, or selected by a broadcaster. Users can subscribe to one or more channels, and upon subscribing, the user can view his or her subscriptions from the homepage of the content hosting site or from a user interface. In some cases activities performed by a user or channel owner are displayed on the activity feeds of their subscribers. In some cases, the content sharing platform allows the user or channel owner to control what activities are displayed on the activity feeds of their subscribers. For example, as part of a log-in or sign-up process the user or channel owner may set one or more privacy settings for various activities. This manual process, however, can be time-consuming and can result in some portion of the users failing to complete the log-in or sign-up process out of frustration.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a feed privacy module receives an indication of the occurrence of an activity in a content sharing platform and creates a private feed item of a first feed item type corresponding to the occurrence of the activity. The activity may include at least one of liking an object, subscribing to a content channel, publishing an object, or adding an object to a playlist. The private feed item may not be shared with other users of the content sharing platform. The feed privacy module may request input pertaining to a privacy setting selection for feed items of the first feed item type and receives the privacy setting selection. If the input pertaining to the privacy setting selection indicates a public setting for feed items of the first feed item type, the feed privacy module converts the private feed item to a public feed item. Public feed items may be shared with other users of the content sharing platform. If the input pertaining to the privacy setting selection indicates a private setting for feed items of the first feed item type, the feed privacy module maintains the private feed item as private.

In one implementation, the feed privacy module may also determine whether the privacy setting selection for feed items of the first feed item type has been previously received. If the privacy setting selection for feed items of the first feed item type has been previous received, and the input pertaining to the privacy setting selection indicates a private setting for feed items of the first feed item type, the feed privacy module may determine whether a threshold period of time has passed since the privacy setting selection was received. If the threshold period of time has passed since the privacy setting selection was received, the feed privacy module may request an update to the privacy setting selection for the feed items of the first feed item type.

BRIEF DESCRIPTION OF THE DRAWINGS

The present disclosure is illustrated by way of example, and not by way of limitation, in the figures of the accompanying drawings.

DETAILED DESCRIPTION

Figure 1:
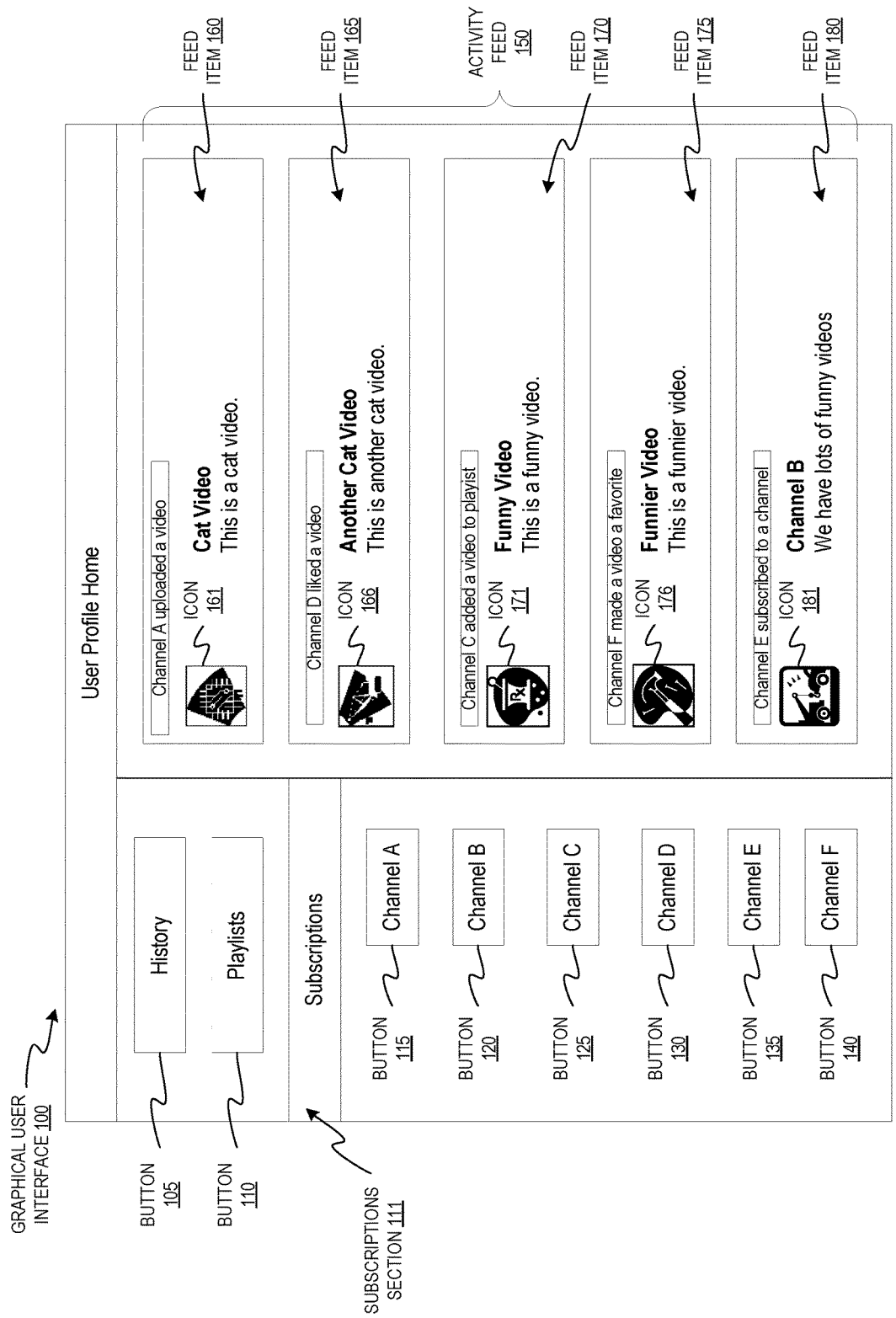
FIG. 1 is a block diagram illustrating an example graphical user interface (GUI) in accordance with one implementation of the present disclosure.

Implementations are described for in-context control of feed privacy settings. A content sharing platform can include one or more channels that are viewable over the Internet. A channel is a mechanism for providing certain media items and/or for providing access to media items to subscribers. Media items for the channel can be selected by a user, uploaded by a user, selected by a content provider, or selected by a broadcaster. In one implementation, at least a portion of the users of the content sharing platform have a channel, which can be used to broadcast, notify, or otherwise make available, media items and activities associated with the user to other users of the content sharing platform. Users can subscribe to one or more channels, and upon subscribing, the user can view his or her subscriptions from the homepage of the content hosting site or from a user interface. In some cases, in which a user is a curator of one or more channels (e.g., one who performs management actions on the channel, such as adding media items to the channel, removing media items from the channel, defining subscription requirements for the channel, defining presentation attributes for channel content, defining access attributes for channel content, etc.), activities performed by the user are displayed on the activity feeds of their subscribers. The user may wish to control what activities are displayed on the activity feeds of their subscribers. For example, the user may wish for other users (e.g., subscribers to the user's channel) to be made aware of certain activities, such as when the user "likes" a video, or subscribes to a certain channel. There may be other activities, however, that the user wishes would remain private, such as when the user uploads a media item or adds a video to a playlist.

Rather than have the user go through a potentially complicated settings menu to individually set the privacy controls for each type of activity, in one implementation, a feed privacy module provides in-context control of feed privacy settings. The control is said to be "in-context" because, for example if a user performs a certain activity, such as uploading a video, in the normal course of using the content sharing platform, at that time, the feed privacy module may display a dialog window to request input pertaining to a privacy setting selection from the user for activities of the same type as the activity which the user just performed. Thus, when the feed privacy module receives an indication of the occurrence of the activity (e.g., uploading a video), the feed privacy module may create a private feed item corresponding to the occurrence of the activity. The feed item may include the name of the user's channel, the name of the video that was uploaded, a description of the video, an icon (e.g., a frame or screencap of the video), or other information. The feed item is not displayed to other users, however, because the feed item is initially created as a private feed item.

The feed privacy module may display a dialog window to the user, or otherwise request input pertaining to a privacy setting selection for activities of the same type as the activity which the user just performed (e.g., the current video upload and all or a portion of future video uploads by the user). The user may select whether to make the feed items associated with this activity public (e.g., subscribers to the user's channel will be notified) or private (e.g., the subscribers will not be notified). Depending on the received privacy setting selection, the feed privacy module can either maintain the created feed item as private or convert the feed item to a public feed item.

In other implementations, the feed privacy module may also determine whether a privacy setting selection for feed items of the same feed item type has been previously received. If a privacy setting selection for feed items of the same feed item type has been previous received, and the privacy setting selection indicates a private setting for feed items of the same feed item type, the feed privacy module can optionally determine whether a threshold period of time (e.g., 30 days) has passed since the privacy setting selection was received. If the threshold period of time has passed since the privacy setting selection was received, the feed privacy module may redisplay the dialog window or otherwise request an update to the privacy setting selection for feed items of the same feed item type.

The in-context control of feed privacy settings allows a user to easily control what information is made publically available on a content sharing platform. The user does not have to navigate potentially complicated settings menus to adjust privacy settings for activities they may not understand. By linking the control of the privacy settings to the occurrence of the actual activity, the user is much more likely to understand the implications of particular settings (e.g., public or private for this activity). The user is also more likely to complete set-up of the privacy settings if they need only set one setting at a time. Since the control of privacy settings is removed from the log-in or sign-up process, the user is also more likely to complete the registration or log-in.

FIG. 1 is a block diagram illustrating an example graphical user interface (GUI) 100 in accordance with one implementation of the present disclosure. In one implementation, the GUI 100 may be a homepage of a user of a content sharing platform. For example, the GUI 100 may be presented by and/or displayed within a web browser when the user accesses the content sharing platform via the web browser. In another implementation, the GUI 100 may be a home interface or a main interface presented by a media viewer (e.g., an app, an application, a program, a software module/component, etc., that may be used to view, play, and/or consume media items). Although the GUI 100 is illustrated using buttons (e.g., buttons 105, 110, 115, etc.), other embodiments may use links and/or other graphical user interface controls or elements in place of one or more of the buttons.

In one implementation, the GUI 100 includes buttons 105 and 110. Button 105 may allow the user to view a history of the media items that the user has consumed (e.g., viewed or played). For example, when the user selects and/or activates the button 105, a new GUI that includes a list of the last (e.g., ten, twenty, fifty or hundred) media items viewed by the user may be presented to the user. The button 110 may allow a user to view different playlists of media items that the user has previously created and/or obtained. A playlist may be a list and/or an order of different media items that can be presented (or played) in sequential or shuffled order without interaction from the user. A media viewer (e.g., a media viewer application and/or a web browser) may play the media items on a playlist in the order in which the media items are listed on the playlist. A user may also transition between media items on a playlist. For example, a user may play the next media item on the playlist or may select a particular media item in the playlist.

In one implementation, the GUI also includes a subscriptions section 111 that includes a list of one or more channels to which the user is currently subscribed. In one implementation, the subscriptions section 111 may include a list of all channels to which the user is subscribed. In another implementation, the subscriptions section 111 may include a subset of channels to which the user is subscribed. For example, the subscriptions section 111 may present a predefined number of channels (e.g., 5 channels), the channels that the user accesses most frequently, the channels that the user has accessed most recently, the channels that the user has most recently subscribed to, etc. Other embodiments of determining the channels to include in a subset of channels displayed can be used without departing from the scope of the disclosure. As illustrated in FIG. 1, the subscriptions section 111 includes buttons 115, 120, 125, 130, 135 and 140. Button 115 is labeled "Channel A" to indicate that that user is subscribed to Channel A, button 120 is labeled "Channel B" to indicate that that user is subscribed to Channel B, button 125 is labeled "Channel C" to indicate that that user is subscribed to Channel C, button 130 is labeled "Channel D" to indicate that that user is subscribed to Channel D, button 135 is labeled "Channel E" to indicate that that user is subscribed to Channel E, and button 140 is labeled "Channel F" to indicate that that user is subscribed to Channel F. In one implementation, a list of media items in a channel may be presented to the user when the user activates a corresponding button for the channel. For example, if the user activates (e.g., clicks on or selects) button 135, the GUI 100 may display a list of videos that are in Channel E. In one implementation, when a user activates (e.g., clicks, selects, etc.) one of the buttons 115 through 140, a menu may appear on the GUI 100 listing media items associated with the channel associated with the activated button. In another implementation, when a user activates one of the buttons 115 through 140, a popup window including a graphic representation (e.g., picture of a single frame from the media item) of media items in the channel associated with the activated button may appear on the GUI 100. For example, media items from the channels may be displayed on the activity feed 150, as discussed further below. It should be understood that in other embodiments, other visual indicators such as graphic representations, and/or text can be presented to a user to provide channels to the user.

The content sharing platform may collect demographic information pertaining to groups of users (e.g., age of user groups, geography of user groups, such as country, state, city) and may store the information in one or more data stores (e.g., hard disks, memories, databases, etc.). In situations in which the embodiments discussed herein collect personal information and/or demographic information about users, or may make use of personal information and/or demographic information, the user may be provided with an opportunity to control whether programs or features collect entity information (e.g., information about a user's social network, social actions or activities, profession, a user's preferences, or a user's current location), or to control whether and/or how to receive content from the content sharing platform that may be more relevant to the user. In addition, certain data may be treated in one or more ways before it is stored or used, so that personally identifiable information is removed. For example, a user's identity may be treated so that no personally identifiable information can be determined for the user, or an user's geographic location may be generalized where location information is obtained (such as to a city, ZIP code, or state), so that a particular location of a user cannot be determined. Thus, the user may have control over how information is collected about the user and used by the content sharing platform.

The activity feed 150 can include information about activities associated with channels to which the user is subscribed. In one implementation, the activity feed 150 can include information about the most recent activities associated with each channel (e.g., media items uploaded to the channel, media items "liked" by the channel, other channels to which the channel has subscribed, playlists created by the channel), as well as a mechanism for the user to perform an action for that activity (e.g., providing a frame, image, and/or icon of the digital content uploaded to the channel that serves as a link to the digital content). If the user uses the activity feed 150 to perform an action, that action can be associated with the channel which performed the activity. In one implementation, the activity feed 150 may be a combined or syndicated activity feed that includes activities associated with multiple channels to which the user is subscribed.

As illustrated in FIG. 1, the activity feed 150 includes feed items 160, 165, 170, 175, and 180. Each feed item may include information about the activity, the title of an associated media item, a description of the media item, and an icon for the media item. For example, the feed item 160 includes information indicating that a curator of channel A has uploaded a video (e.g., "Channel A uploaded a video"), includes the title of the video (e.g., Cat Video), a description of the video (e.g., "This is a cat video"), and an icon 161. An icon (e.g., icon 161) may be text, a thumbnail, an image, a frame, and/or some other graphic used to represent the media item for the feed item 160. Icons 166, 171, 176, and 181 are used to represent the media items (e.g., videos) associated with feed items 165, 170, 175, and 180 respectively. Although a list of videos are shown as being included in the activity feed 150, it should be understood that in other embodiments, other activity feed information may be shown in the GUI 100. For example, an image (e.g., a JPEG) may be shown in the GUI 100. In another example, digital music (e.g., an MP3) may be played in the GUI 100. In yet another example, social media information (e.g., a tweet, a like, etc.) may be shown in the GUI 100. In one implementation, when a user is unsubscribed from a channel, media items from the channel may be removed from the activity feed of the user. For example, when a user is unsubscribed from channel C, feed item 170 may be removed from the activity feed 150.

The additional feed items in activity feed 150 may be associated with the same or different types of activities. For example, the feed item 165 includes information indicating that a curator of channel D has approved of a video ("Channel D liked a video"), includes the title of the video (e.g., Another Cat Video), a description of the video (e.g., "This is another cat video"), and icon 166. Feed item 170 includes information indicating that a curator of channel C has added a video to a playlist (e.g., "Channel C added a video to a playlist"), includes the title of the video (e.g., Funny Video), a description of the video (e.g., "This is a funny video"), and icon 171. Feed item 175 includes information indicating that a curator of channel F has designated a video as favorite (e.g., "Channel F made a video a favorite"), includes the title of the video (e.g., Funnier Video), a description of the video (e.g., "This is a funnier video"), and icon 176. Feed item 180 includes information indicating that a curator of channel E has subscribed to a channel (e.g., "Channel E subscribed to a channel"), includes the name of the channel to which Channel E subscribed (e.g., Channel B), a description of the channel (e.g., "We have lots of funny videos"), and icon 181.

In one implementation, the feed items 160-180 in activity feed 150 are all public feed items. They are displayed in activity feed 150 because the user (e.g., curators of each of the corresponding channels (e.g., Channels A-F)) elected to make feed items of each particular feed item type public and visible to subscribers of the channels. Had instead, the user or curator of one or more of Channels A-F elected to make a certain type of feed item private, feed items of that type would not be visible in activity feed 150. In one implementation, the users or curators of Channels A-F may use the in-context feed privacy setting control techniques described herein to control the privacy settings with respect to which feed items are visible in the activity feeds (e.g., activity feed 150) of their subscribers. In one implementation, the feed items may be semi-private. Semi-private feed items may be made available to a certain subset of users, such as other users with which the user or channel curator has a certain connection with (e.g., a "friend" or part of a "circle") or particular other users that the user or channel curators specifies. Additional details of in-context control of feed privacy settings are provided below.

Figure 2:
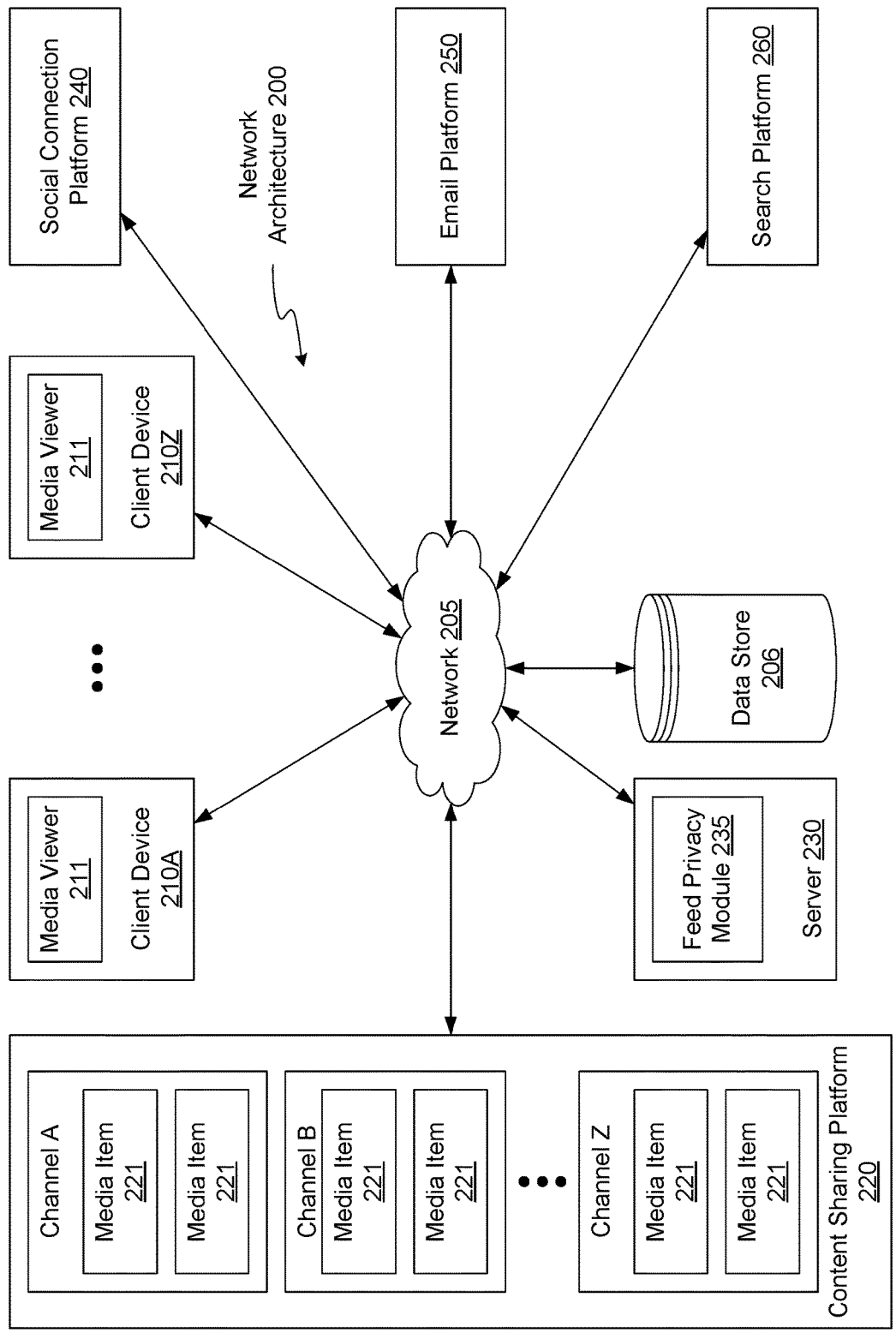
FIG. 2 is a block diagram illustrating an exemplary network architecture in which implementations of the present disclosure may be implemented.

FIG. 2 is a block diagram illustrating an exemplary network architecture 200 in which implementations of the present disclosure may be implemented. In one implementation, the network architecture 200 includes client devices 210A through 210Z, a network 205, a data store 206, a content sharing platform 220, a server 230, a social connection platform 240, an email platform 250, and a search platform 260. In one implementation, network 205 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 206 may be may be a memory (e.g., random access memory), a cache, a drive (e.g., a hard drive), a flash drive, a database system, or another type of component or device capable of storing data. The data store 206 may also include multiple storage components (e.g., multiple drives or multiple databases) that may also span multiple computing devices (e.g., multiple server computers).

The client devices 210A through 210Z may each include computing devices such as personal computers (PCs), laptops, mobile phones, smart phones, tablet computers, netbook computers, etc. Each client device may include a media viewer 211. In one implementation, the media viewer 211 may be an application that allows users to view content, such as images, videos, web pages, documents, etc. For example, the media viewer 211 may be a web browser that can access, retrieve, present, and/or navigate content (e.g., web pages such as Hyper Text Markup Language (HTML) pages, digital media items, etc.) served by a web server. The media viewer 211 may render, display, and/or present the content (e.g., a web page, a media viewer) to a user. The media viewer 211 may also display an embedded media player (e.g., a Flash® player or an HTML5 player) that is embedded in a web page (e.g., a web page that may provide information about a product sold by an online merchant). In another example, the media viewer 211 may be a standalone application that allows users to view digital media items (e.g., digital videos, digital images, electronic books). The media viewer 211 may be provided to the client devices 210A through 210Z by the server 230 and/or content sharing platform 220. For example, the media viewer 211 may be an embedded media player that is embedded in a web page provided by the content sharing platform 220. In another example, the media viewer 211 may be an application that is downloaded from the server 230.

In one implementation, content sharing platform 220 may include one or more computing devices (such as a rack mount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 220 may allow a user to consume, upload, search for, approve of ("like"), dislike, and/or comment on media items. The content sharing platform 220 may also include a website (e.g., a webpage) that may be used to provide a user with access to the media items. The content sharing platform 220 may include multiple channels (e.g., channels A through Z). Each channel may include one or more media items 221. Examples of a media item 221 can include, and are not limited to, digital videos, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, and the like. A media item 221 may be consumed via the Internet and/or via a mobile device application. For brevity and simplicity, an online video (also hereinafter referred to as a video) is used as an example of a media item throughout this document. As used herein, "media," media items," "online media items," "digital media," and "digital media items" can include an electronic file that can be executed or loaded using software, firmware or hardware configured to present the digital media item to an entity. In one implementation, the content sharing platform 220 may store the media items using the data store 206.

Social connection platform 240 may include one or more computing devices (e.g., servers), data stores, networks, software components, and/or hardware components that may be used to allow users to connect to, share information, and/or interact with each other. Social connection platform 240 may present to a user a listing (e.g., activity feed, feed, stream, wall, etc.) of objects (such as posts, content items (e.g., video, images, audio, etc.), status updates, favorability indications, tags, messages, and so on) generated by other users of a social network. Social connection platform 240 may also include a content sharing aspect that allows users to upload, view, tag, and share content, such as text content, video content, image content, audio content, and so on. Other users of social connection platform 240 may comment on the shared content, discover new content, locate updates, share content, and otherwise interact with the provided content. In one implementation, content sharing platform 220 may be integrated with social connection platform 240. For example, social connection platform 240 may use content sharing platform 220 to allow users to upload and/or share content. In another implementation, social connection platform 240 may be separate from content sharing platform 220. In one implementation, social connection platform 240 may also include chat functionality (e.g., a chat platform) to allow users to chat (e.g., to instant message) each other.

In one implementation, email platform 250 may be one or more computing devices (e.g., servers), data stores, networks, software components, and/or hardware components that may be used to allow users to send and/or receive electronic-mail (emails) to each other. For example, a first user may use the email platform 250 to send an email to a second user regarding the time and location of a particular event. The first user may also attached files (e.g., video files, image files, text files, etc.) to the email. In one implementation, the email platform 250 may also include chat functionality (e.g., a chat platform) to allow users to chat (e.g., to instant message) each other. In another implementation, the search platform 260 may be one or more computing devices, data stores, networks, software components, and/or hardware components that may be used to allow users to search for information and/or data. For example, the search platform 260 may allow a user to search the Internet and/or other networks for articles, blogs, websites, webpages, images, videos, and/or other content related to a particular topic (e.g., how to fix a car). The search platform 260 may also include a search engine.

In one implementation, server 230 may include one or more computing devices (e.g., a rack mount server, a server computer, etc. In one implementation, server 230 may be included in one or more of content sharing platform 220, social connection platform 240, email platform 250, and search platform 260. In another implementation, server 230 may be separate from content sharing platform 220, social connection platform 240, email platform 250, and search platform 260 but may communicate (e.g., exchange data with) content sharing platform 220, social connection platform 240, email platform 250, and search platform 260. In one implementation, server 230 includes a feed privacy module 235. Feed privacy module 235 may allow a user of the content sharing platform 220 to perform in-context control of feed privacy settings for feed items. Additional details of feed privacy module 235 are provided below.

Figure 3:
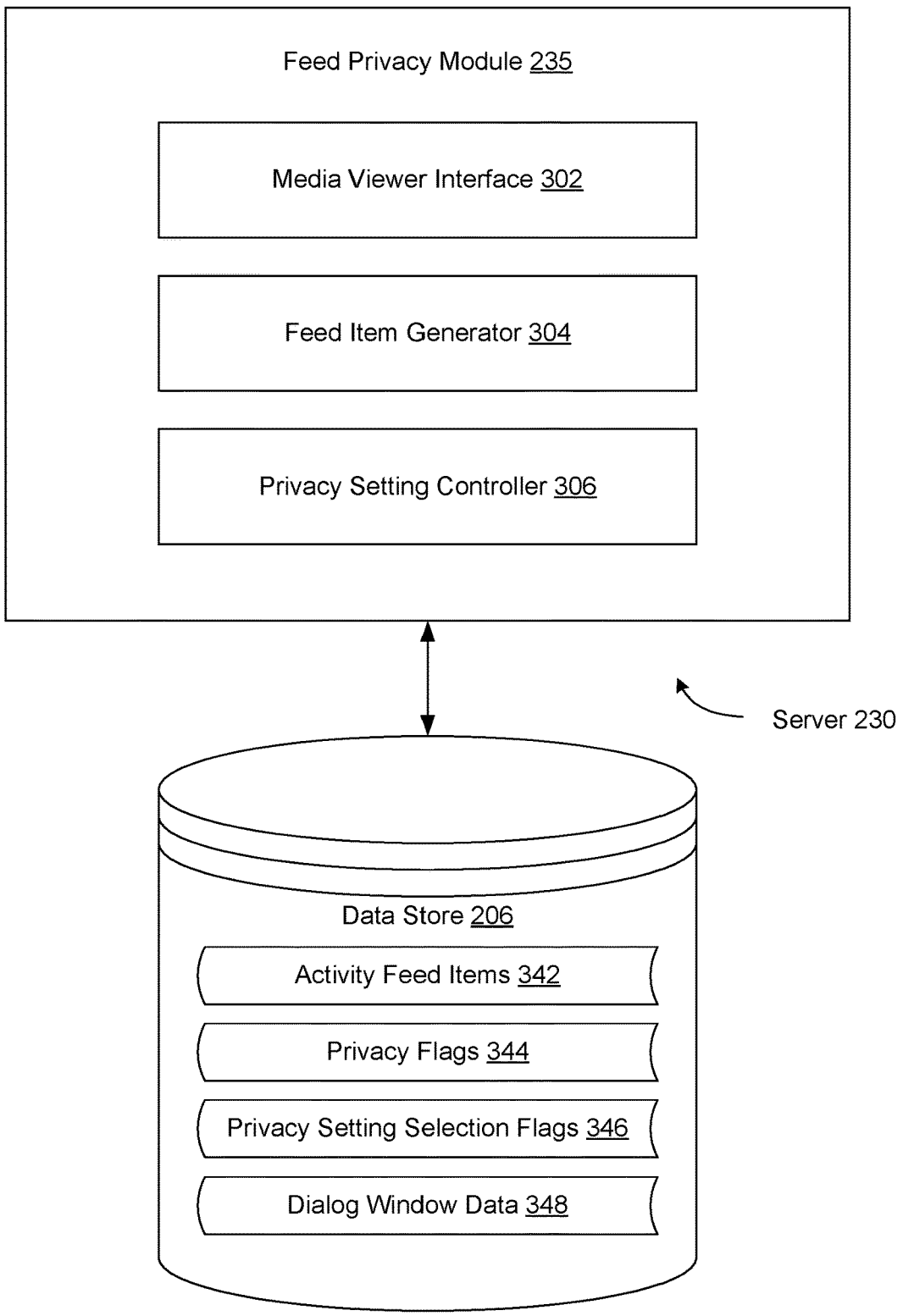
FIG. 3 is a block diagram illustrating a feed privacy module for in-context control of feed privacy settings, according to an implementation.

FIG. 3 is a block diagram illustrating a feed privacy module 235 for in-context control of feed privacy settings, according to an implementation. In one implementation, feed privacy module 235 includes media viewer interface 302, feed item generator 304 and privacy setting controller 306. This arrangement of modules and components may be a logical separation, and in other implementations, these modules or other components can be combined together or separated in further components, according to a particular implementation. In one implementation, data store 206 is connected to feed privacy module 235 and includes activity feed items 342, privacy flags 344, privacy setting selection flags 346 and dialog window data 348. In one implementation, server 230 may include both feed privacy module 235 and data store 206. In another implementation, data store 206 may be external to server 230 and may be connected to server 230 over a network or other connection. In other implementations, server 230 may include different and/or additional components which are not shown to simplify the description. Data store 206 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one implementation, media viewer interface 302 generates and/or controls interactions with a user interface, such as GUI 100, that is part of a website or application (e.g., mobile application or app), such as media viewer 211, running on a client device 210A-210Z. For example, media viewer interface 302 may provide feed items, such as feed items 160-180 to be displayed in the activity feed 150 in GUI 100. Media viewer interface may also receive indications of performed activities from media viewer 211. For example, if the user performs an activity, such as "liking" a video, uploading a video, adding a video to a playlist, subscribing to a channel, etc., media viewer 211 may provide an indication of the occurrence of that activity to feed privacy module 235. In one implementation, the indication may include an Asynchronous JavaScript and XML (AJAX) call from media viewer 211 to feed privacy module 235. Media viewer interface 302 may receive the indication of the occurrence of the activity.

In one implementation, feed item generator 304 may generate an activity feed item in response to the indication of the occurrence of an activity being received. Media viewer interface 302 may notify feed item generator 304 that an indication of an occurrence of an activity was received and, in response, feed item generator 304 may generate an activity feed item. In one implementation, the feed item may include information about the activity, the title of an associated media item, a description of the media item, an icon representing the media item, and/or other information. The feed item may be suitable for display in other users' activity feeds to notify those other users of the occurrence of the activity. In one implementation, feed item generator 304 may initially create the feed item as a private feed item, which is not shared with other users of the content sharing platform 220. In another implementation, feed item generator 304 creates the feed item as a public feed item, which is shared with the other users. In one implementation, whether a public or private feed item, feed item generator 304 may store a copy of the feed item in activity feed items 342 in data store 206.

In one implementation, privacy setting controller 306 manages the privacy settings for the feed items in activity feed items 342. For example, privacy setting controller 306 may maintain privacy flags 344 and privacy setting selection flags 346 in data store 206. In one implementation, privacy flags 344 may include one or more flags (e.g., a single bit) for each type of activity defined in the content sharing platform 220 to indicate whether feed items associated with that activity should be made public or private for the current user. For example, one of privacy flags 344 may have a value of "1" to indicate a true condition (i.e., that feed items for the corresponding activity type should be made private) or "0" to indicate a false condition (i.e., that feed items for the corresponding activity type should be made public). In other implementations, the values may be reversed, or some other value besides a single bit may be used. In one implementation, privacy flags 344 include a flag for each of "liking" a media item, uploading a media item, adding a media item to a playlist, and subscribing to a channel. In other implementations, privacy flags 344 may include flags for additional and/or different activity types. In one implementation, all of privacy flags 344 are initially set to "private" by default. In other implementations, one or more of privacy flags 344 may have some other default setting (e.g., public).

In one implementation, upon the creation of a feed item by feed item generator 304, privacy setting controller 306 instructs media viewer interface 302 to display a dialog window in GUI 100 to request a privacy setting selection for the type of activity corresponding to the feed item. The dialog window may include a description of the activity type, an indication of what will result from selection private or public (i.e., that feed items for activities of this same type will be made visible to other users in the future) and/or a means for receiving the privacy setting selection. For example, the dialog window may include buttons, check boxes, radio buttons, a pull-down menu, a text input field, or other means for the user to select either "public" or "private." In other implementations, rather than a dialog window, media viewer interface 302 may display a pop-up window, inline text, or other form of request for the input pertaining to the privacy setting selection. In other implementations there may be additional and/or different privacy settings available for selection. Media viewer interface 302 receives the privacy setting selection and notifies privacy setting controller 306. In turn, privacy setting controller 306 instructs feed item generator 304 to either maintain the feed item as private or convert the feed item to a public feed item, as appropriate. Privacy setting controller 306 may also set the corresponding flag in privacy flags 344 based on the received privacy setting selection.

In one implementation, privacy setting selection flags 346 indicate whether a dialog box has been displayed and a privacy setting selection received for a particular type of activity. For example, one of privacy setting selection flags 346 may have a value of "1" to indicate a true condition (i.e., that the dialog box was previously displayed a privacy setting selection was received) or "0" to indicate a false condition (i.e., that the dialog box has not been displayed or a privacy setting selection has not been received). In other implementations, the values may be reversed, or some other value besides a single bit may be used. In one implementation, privacy setting selection flags 346 include a flag for each of "liking" a media item, uploading a media item, adding a media item to a playlist, and subscribing to a channel. In other implementations, privacy setting selection flags 346 may include flags for additional and/or different activity types. In one implementation, all of privacy setting selection flags 346 are initially set to "false" by default.

In one implementation, upon receiving the notification of the occurrence of an activity from media viewer interface 302, privacy setting controller 306 may consult privacy setting selection flags 346 to determine whether the flag corresponding to the activity type is set to "false." If the flag is set to false, privacy setting controller 306 may instruct media viewer interface 302 to display a dialog window in GUI 100 to request a privacy setting selection for the type of activity corresponding to the feed item, as discussed above. If, however, the flag is set to true, in one implementation, privacy setting controller 306 may consult privacy flags 344 to determine whether the previously received privacy control setting was "public" or "private." If the flag corresponding to the activity type in privacy flags 344 indicates that the feed item should be made public, privacy setting controller 306 instructs feed item generator 304 to convert the feed item in activity feed items 342 to a public feed item. If the flag corresponding to the activity type in privacy flags 344 indicates that the feed item should be made private, privacy setting controller 306 may consult dialog window data 348. Dialog window data 348 may store time information related to various dialog windows. For example, dialog window data 348 may store an indication of when a dialog window for a certain activity type was last displayed in GUI 100 or when a privacy setting selection for the activity type was received. Dialog window data 348 may also include a threshold time value (e.g., 30 days). In one implementation, privacy setting controller 306 may compare the time value stored in dialog window data 348 associated with the activity type with the threshold time value. If the time value is within the threshold value (i.e., the difference between the time value and a current time is less than or equal to the threshold value), privacy setting controller 306 may instruct the feed item generator 304 to maintain the feed item as a private feed item. If however, the threshold period of time has passed since the privacy setting selection was received, privacy setting controller 306 may instruct media viewer interface 302 to re-display the dialog window to receive an update to the privacy setting selection.

Figure 4:
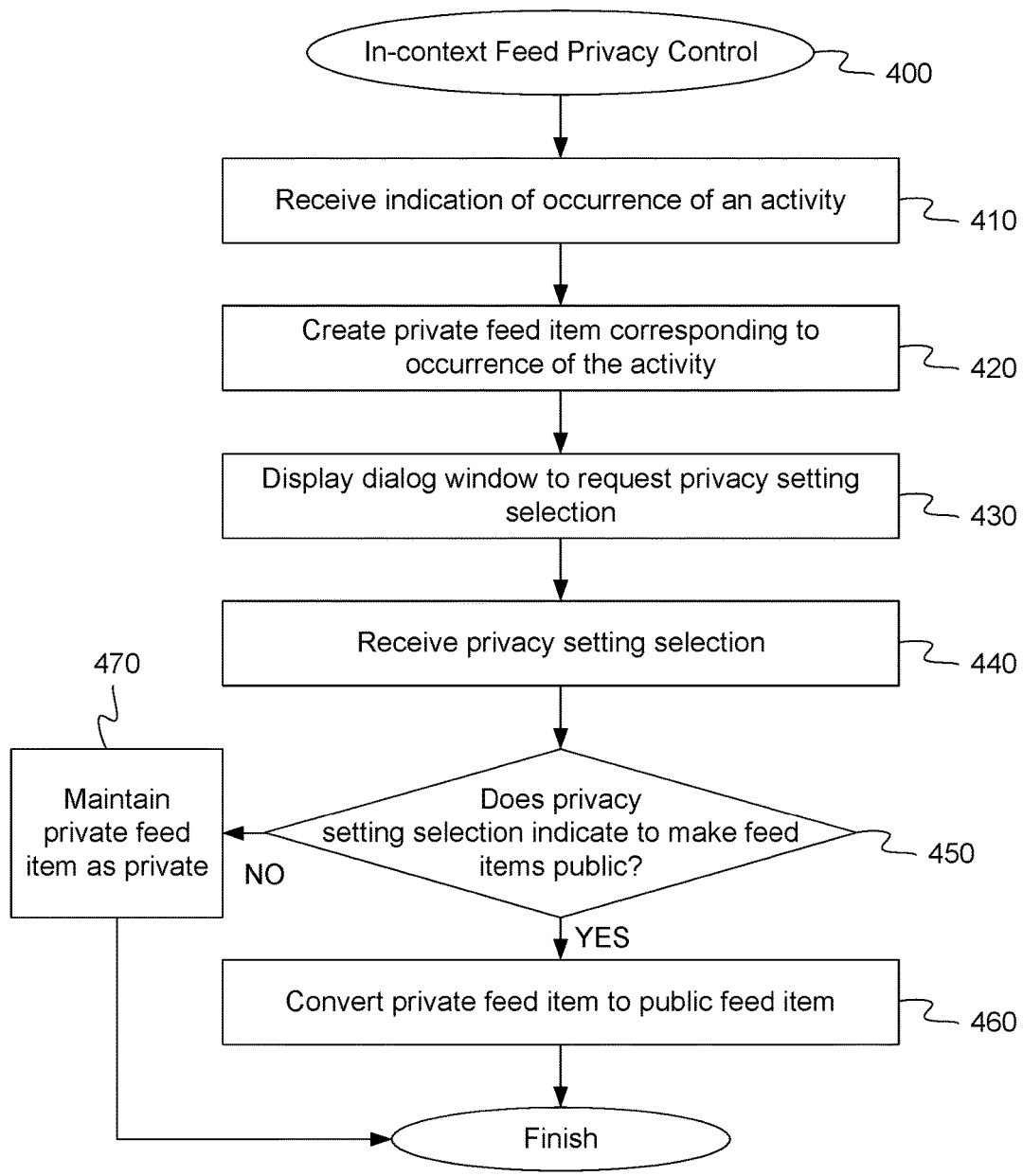
FIG. 4 is a flow diagram illustrating a method for in-context feed privacy control, according to some implementations.

FIG. 4 is a flow diagram illustrating a method for in-context feed privacy control, according to some implementations. The method 400 may be performed by processing logic that comprises hardware (e.g., circuitry, dedicated logic, programmable logic, microcode, etc.), software (e.g., instructions run on a processing device to perform hardware simulation), or a combination thereof. The method 400 can manage privacy settings for feed items associated with certain activities in a content sharing platform as the activities occur. For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by feed privacy module 235, as shown in FIGS. 2 and 3.

Referring to FIG. 4, at block 410, method 400 receives an indication of the occurrence of an activity. For example, if the user performs an activity, such as "liking" a video, uploading a video, adding a video to a playlist, subscribing to a channel, etc., media viewer 211 may provide an indication of the occurrence of that activity to feed privacy module 235. In one implementation, the indication may include an Asynchronous JavaScript and XML (AJAX) call from media viewer 211 to feed privacy module 235. Media viewer interface 302 may receive the indication of the occurrence of the activity.

At block 420, method 400 creates a private feed item corresponding to the occurrence of the activity. In one implementation, feed item generator 304 may generate an activity feed item in response to the indication of the occurrence of an activity being received. Media viewer interface 302 may notify feed item generator 304 that an indication of an occurrence of an activity was received and, in response, feed item generator 304 may generate an activity feed item. In one implementation, the feed item may include information about the activity, the title of an associated media item, a description of the media item, an icon representing the media item, and/or other information. The feed item may be suitable for display in other users' activity feeds to notify those other users of the occurrence of the activity. In one implementation, feed item generator 304 may initially create the feed item as a private feed item, which is not shared with other users of the content sharing platform 220.

At block 430, method 400 displays a dialog window to request a privacy setting selection. In one implementation, privacy setting controller 306 instructs media viewer interface 302 to display a dialog window in GUI 100 to request a privacy setting selection for the type of activity corresponding to the feed item. The dialog window may include a description of the activity type, an indication of what will result from selection private or public (i.e., that feed items for activities of this same type will be made visible to other users in the future) and/or a means for receiving the privacy setting selection. For example, the dialog window may include buttons, check boxes, radio buttons, a pull-down menu, a text input field, or other means for the user to select either "public" or "private." In other implementations there may be additional and/or different privacy settings available for selection.

At block 440, method 400 receives a privacy setting selection. In one implementation, media viewer interface 302 receives the privacy setting selection and notifies privacy setting controller 306. At block 450, method 400 determines whether the privacy setting selection indicates to make feed items for the type of activity public. If the privacy setting selection does not indicates to make the feed items public, at block 470, method 400 maintains the feed item as a private feed item. If the privacy setting selection does indicate to make the feed item public, at block 460, method 400 converts the private feed item to a public feed item. In one implementation, privacy setting controller 306 instructs feed item generator 304 to either maintain the feed item as private or convert the feed item to a public feed item, as appropriate. Privacy setting controller 306 may also set the corresponding flag in privacy flags 344 based on the received privacy setting selection.

Figure 5:
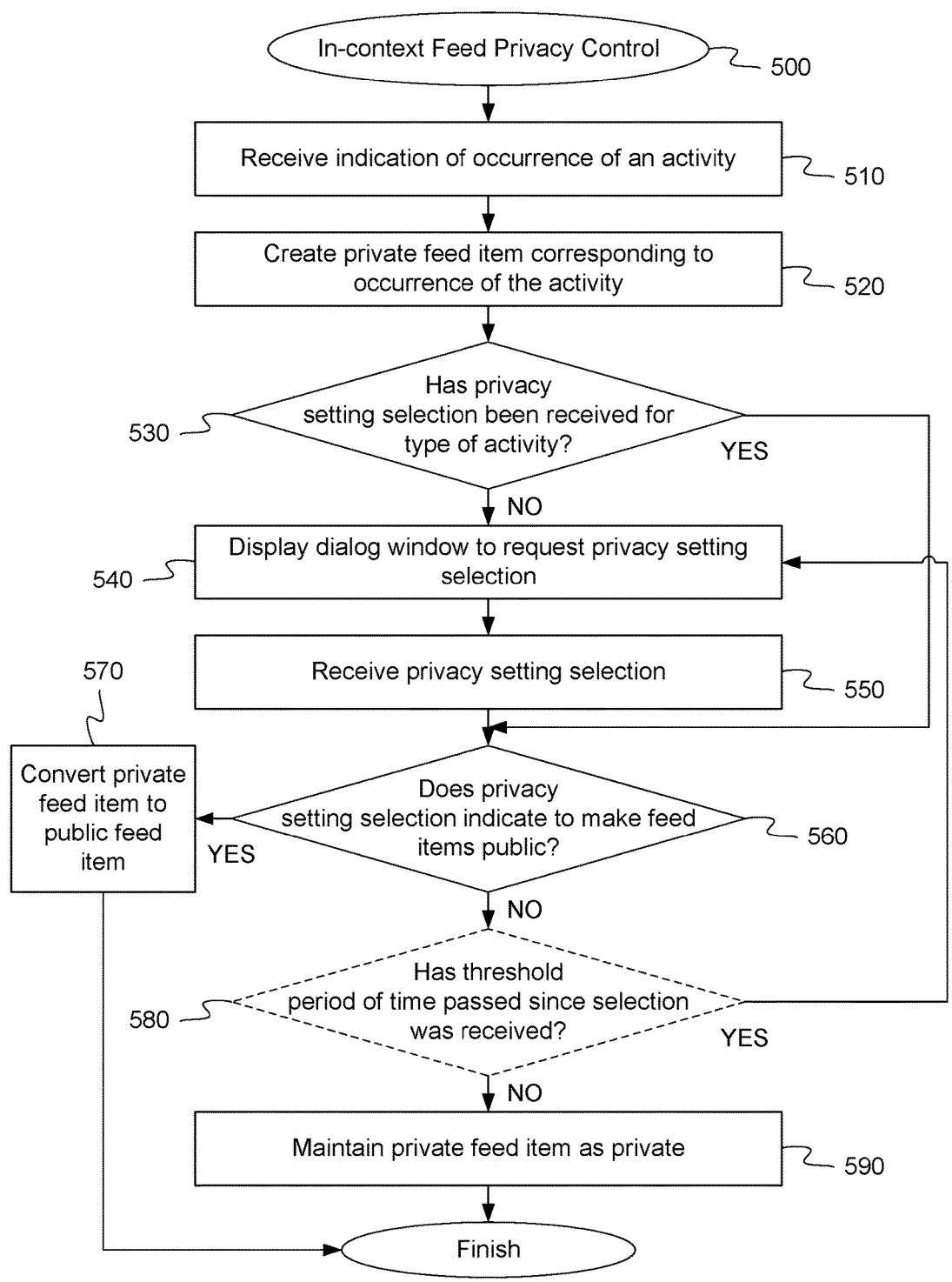
FIG. 5 is a flow diagram illustrating a method for in-context feed privacy control, according to some implementations.

FIG. 5 is a flow diagram illustrating a method for in-context feed privacy control, according to some implementations. The method 500 may be performed by processing logic that comprises hardware (e.g., circuitry, dedicated logic, programmable logic, microcode, etc.), software (e.g., instructions run on a processing device to perform hardware simulation), or a combination thereof. The method 500 can manage privacy settings for feed items associated with certain activities in a content sharing platform as the activities occur. In one implementation, method 500 may be performed by feed privacy module 235, as shown in FIGS. 2 and 3.

Referring to FIG. 5, at block 510, method 500 receives an indication of the occurrence of an activity. At block 520, method 500 creates a private feed item corresponding to the occurrence of the activity.

At block 530, method 500 determines whether a privacy setting selection has previously been received for the type of activity that occurred. In one implementation, upon receiving the notification of the occurrence of an activity from media viewer interface 302, privacy setting controller 306 may consult privacy setting selection flags 346 to determine whether the flag corresponding to the activity type is set to "false." If the flag is set to false, indicating that no privacy setting selection has been received, at block 540, method 500 may display the dialog window to request a privacy setting selection. Privacy setting controller 306 may instruct media viewer interface 302 to display a dialog window in GUI 100 to request a privacy setting selection for the type of activity corresponding to the feed item, as discussed above. At block 550, method 500 receives a privacy setting selection. If, however, the flag is set to true, indicating that a privacy setting selection has previously been received, at block 560, method 500 determines whether the privacy setting selection indicates to make the feed items for that activity type public. In one implementation, privacy setting controller 306 may consult privacy flags 344 to determine whether the previously received privacy control setting was "public" or "private."

If the privacy setting selection does indicate to make the feed items public, at block 570, method 500 converts the feed item to a public feed item. If the flag corresponding to the activity type in privacy flags 344 indicates that the feed item should be made public, privacy setting controller 306 instructs feed item generator 304 to convert the feed item in activity feed items 342 to a public feed item. If the privacy setting selection does not indicate to make the feed item public, at block 580, method 500 optionally determines whether a threshold period of time has passed since the privacy setting selection was received. If the flag corresponding to the activity type in privacy flags 344 indicates that the feed item should be made private, privacy setting controller 306 may consult dialog window data 348. Dialog window data 348 may store time information related to various dialog windows. For example, dialog window data 348 may store an indication of when a dialog window for a certain activity type was last displayed in GUI 100 or when a privacy setting selection for the activity type was received. Dialog window data 348 may also include a threshold time value (e.g., 30 days). In one implementation, privacy setting controller 306 may compare the time value stored in dialog window data 348 associated with the activity type with the threshold time value. If the time value is within the threshold value (i.e., the difference between the time value and a current time is less than or equal to the threshold value), at block 590, method 500 maintains the feed item as a private feed item. In one implementation, privacy setting controller 306 may instruct the feed item generator 304 to maintain the feed item as a private feed item. If however, the threshold period of time has passed since the privacy setting selection was received, method 500 may return to block 540. In one implementation, privacy setting controller 306 may instruct media viewer interface 302 to re-display the dialog window or otherwise request an update to the privacy setting selection. Method 500 may then repeat the operations in blocks 540-590, as appropriate.

Figure 6:
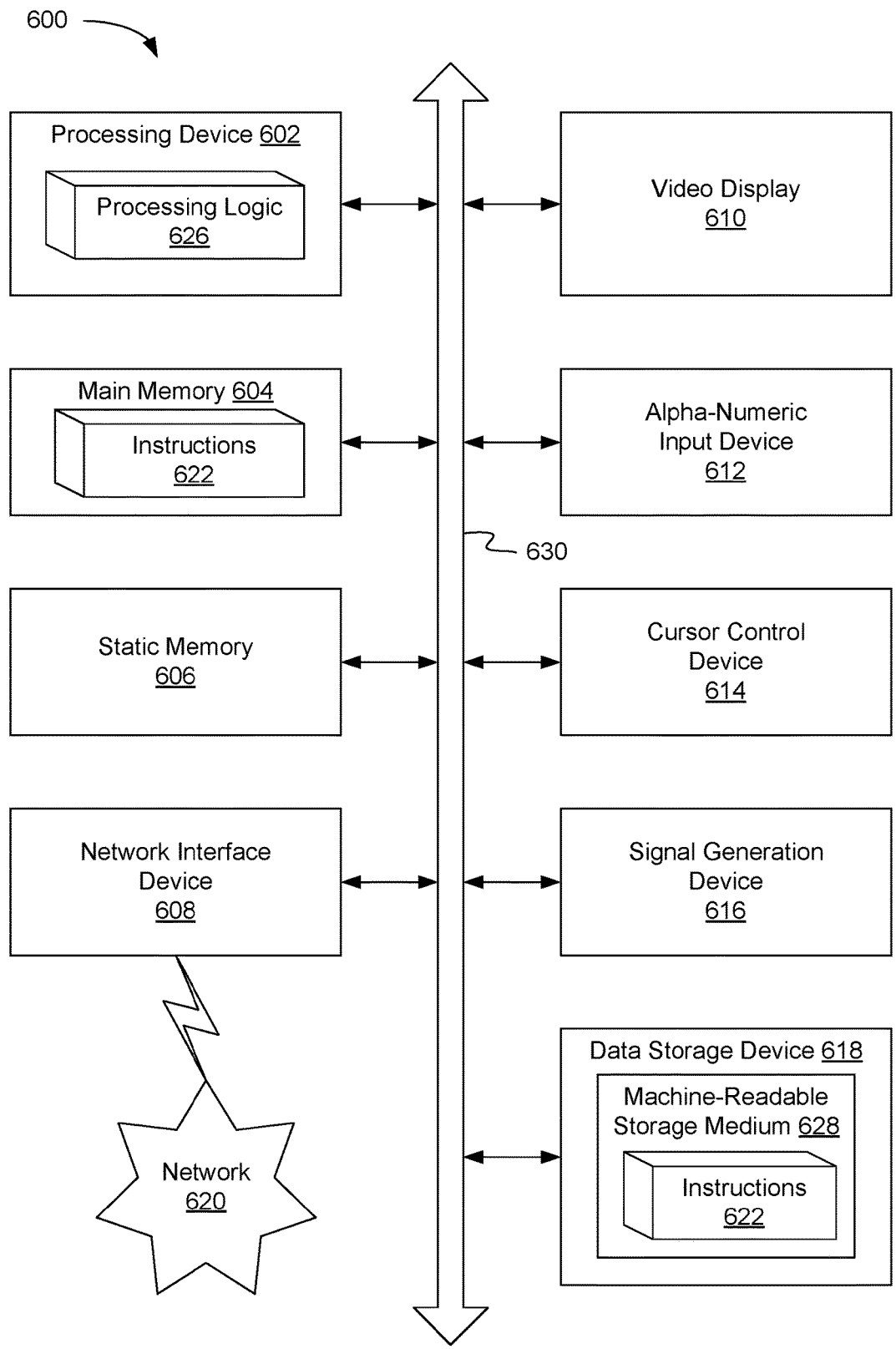
FIG. 6 is a block diagram illustrating an exemplary computer system, according to some implementations.

FIG. 6 illustrates a diagrammatic representation of a machine in the exemplary form of a computer system 600 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, computer system 600 may be representative of a user device, such as client devices 210A-210Z, or of a server, such as server 230, running feed privacy module 235.

The exemplary computer system 600 includes a processing device 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable storage medium 628, on which is stored one or more set of instructions 622 (e.g., software) embodying any one or more of the methodologies of functions described herein. The instructions 622 may also reside, completely or at least partially, within the main memory 604 and/or within the processing device 602 during execution thereof by the computer system 600; the main memory 604 and the processing device 602 also constituting machine-readable storage media. The instructions 622 may further be transmitted or received over a network 620 via the network interface device 608.

The machine-readable storage medium 628 may also be used to store instructions to perform a method for in-context control of feed privacy settings, as described herein. While the machine-readable storage medium 628 is shown in an exemplary implementation to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

In situations in which the systems discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the media server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the web server or media server.

Reference throughout this specification to "one implementation" or "an implementation" means that a particular feature, structure, or characteristic described in connection with the implementations included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

What is claimed is:

1. A method comprising:
   receiving, by a processing device, an indication of an occurrence of an activity in a content sharing platform, the occurrence of the activity corresponding to a feed item of a first feed item type;
   determining, by a processing device, a privacy setting for the first feed item type;
   providing, by the processing device, a user interface that simultaneously presents the feed item of the first feed item type and the determined privacy setting for the first feed item type;
   receiving, by the processing device, user input indicating a privacy setting selection corresponding to the determined privacy setting for the first feed item type while the user interface presents the feed item;
   in response to the privacy setting selection, updating, by the processing device, the privacy setting for multiple feed items comprising the feed item and a subsequent feed item of the first feed item type; and
   requesting an update to the privacy setting for the first feed item type in response to determining that a threshold period of time has passed since receiving the privacy setting selection for the first feed item type.

2. The method of claim 1, wherein the activity comprises at least one of liking an object, subscribing to a content channel, publishing an object, or adding an object to a playlist.

3. The method of claim 1, further comprising:
   in response to the user input indicating a private setting for the feed item of the first feed item type, maintaining the feed item as private.

4. The method of claim 1, further comprising:
   determining that the privacy setting selection for the first feed item type has been previously received.

5. The method of claim 4, further comprising:
   determining that the user input pertaining to the privacy setting selection indicates a private setting for the first feed item type.

6. The method of claim 1, wherein the multiple feed items comprise a public feed item to be shared with other users of the content sharing platform and a private feed item that is not shared with the other users.

7. A non-transitory machine-readable storage medium storing instructions which, when executed, cause a processing device to perform operations comprising:

receiving an indication of an occurrence of an activity in a content sharing platform, the occurrence of the activity corresponding to a feed item of a first feed item type;

determining, by a processing device, a privacy setting for the feed item type;

providing a user interface that simultaneously presents the feed item of the first feed item type and the determined privacy setting for the first feed item type;

receiving user input indicating a privacy setting selection corresponding to the determined privacy setting for the first feed item type while the user interface presents the feed item;

in response to the privacy setting selection, updating the privacy setting for multiple feed items comprising the feed item and a subsequent feed item of the first feed item type; and requesting an update to the privacy setting for the first feed item type responsive to determining that a threshold period of time has passed since receiving the privacy setting selection for the first feed item type.

8. The non-transitory machine-readable storage medium of claim 7, wherein the activity comprises at least one of liking an object, subscribing to a content channel, publishing an object, or adding an object to a playlist.

9. The non-transitory machine-readable storage medium of claim 7, wherein the operations further comprise:

responsive to the user input indicating a private setting for the feed items of the first feed item type, maintaining the feed item as private.

10. The non-transitory machine-readable storage medium of claim 7, wherein the operations further comprise:

determining that the privacy setting selection for the first feed item type has been previously received.

11. The non-transitory machine-readable storage medium of claim 10, wherein the operations further comprise:

determining that the user input pertaining to the privacy setting selection indicates a private setting for the first feed item type.

12. The non-transitory machine-readable storage medium of claim 7, wherein the multiple feed items comprise a public feed item to be shared with other users of the content sharing platform and a private feed item that is not shared with the other users.

13. A computer system comprising:

a memory;

a processing device coupled to the memory, wherein the processing device is to:

receive an indication of an occurrence of an activity in a content sharing platform, the occurrence of the activity corresponding to a feed item of a first feed item type;

determine a privacy setting for the feed item type;

provide a user interface that simultaneously presents the feed item of the first feed item type and the determined privacy setting for the first feed item type;

receive user input indicating a privacy setting selection corresponding to the determined privacy setting for the first feed item type while the user interface presents the feed item;

in response to the privacy setting selection, update the privacy setting for multiple feed items comprising the feed item and a subsequent feed item of the first feed item type; and request an update to the privacy setting for the first feed item type responsive to a determination that a threshold period of time has passed since receipt of the privacy setting selection for the first feed item type.

14. The computer system of claim 13, wherein the activity comprises at least one of liking an object, subscribing to a content channel, publishing an object, or adding an object to a playlist.

15. The computer system of claim 13, wherein the processing device is further to:

responsive to the user input indicating a private setting for the multiple feed items of the first feed item type, maintain the multiple feed items as private.

16. The computer system of claim 13, wherein the processing device is further to: determine that the user input pertaining to the privacy setting selection indicates a private setting for the first feed item type.

* * * * *